United States Patent [19]
Whitman et al.

[11] Patent Number: 5,292,089
[45] Date of Patent: Mar. 8, 1994

[54] TIE DOWN APPARATUS

[75] Inventors: James M. Whitman; Jeffrey J. Whitman, both of Fargo, N. Dak.

[73] Assignee: Alvin Leingang, Mandan, N. Dak.; by said James M. Whitman

[21] Appl. No.: 832,005

[22] Filed: Feb. 6, 1992

[51] Int. Cl.$^5$ .............................................. B64F 1/12
[52] U.S. Cl. ............................... 244/115; 244/110 R; 114/230; 280/491.1; 280/480.1; 242/107; 242/107.4 D
[58] Field of Search ................... 244/115, 110 R, 116; 114/230, 247, 253, 217; 410/2, 3, 10, 11, 23, 96; 242/107, 107.4 D; 280/491.1, 480.1

[56] References Cited

U.S. PATENT DOCUMENTS

| | | | |
|---|---|---|---|
| 1,592,019 | 7/1926 | Weber | 114/217 |
| 1,695,096 | 12/1928 | Hanses | 242/107.4 R |
| 2,714,019 | 7/1955 | Williams et al. | 242/107 |
| 3,012,736 | 12/1961 | Brust | 114/230 |
| 3,083,992 | 4/1963 | Post | 114/247 |
| 3,110,331 | 11/1963 | Buchanan | 114/217 |
| 3,317,936 | 5/1967 | Johnson et al. | 242/107 |
| 3,851,613 | 12/1974 | Armour | 114/230 |
| 3,904,154 | 9/1975 | Jones | 410/3 |
| 3,912,192 | 10/1975 | Shirley | 244/116 |
| 4,072,257 | 2/1978 | Hall | 410/3 |
| 4,842,458 | 6/1989 | Carpenter | 410/3 |
| 4,846,090 | 7/1989 | Palmquist | 114/230 |

FOREIGN PATENT DOCUMENTS 1032106  6/1958  Fed. Rep. of Germany ... 244/110 R Primary Examiner—David A. Bucci
Assistant Examiner—Anne E. Bidwell
Attorney, Agent, or Firm—Robert E. Kleve

[57] ABSTRACT

The invention comprises a restraining tie down apparatus for tieing down a movable object, such as an aircraft, in a straight line connection between the stationary object and the aircraft. The restraining tie down apparatus has a storage compartment or container which is adapted to be fixed upright in the ground with with an opening at the top which is flush with the top surface of the ground. A tie down device is removably mounted within the container. The tie down device has a frame with a pair of side panels and a spool is rotatably mounted between the side panels. An elongated flexible belt is wound on the spool with its inner end attached to the spool and its outer end having a hook attached thereto. A second hook is attached to the frame of the tie down device. A spring is mounted to the frame with one end attached to the frame and its other end attached to the spool to urge the spool to rotate on the frame in a direction to wind the belt onto the spool. The container has a pair of doors mounted over the top of the container which can be opened for the removal of the tie down device from the container through the top opening in the container. The hook attached to the outer end of the belt of the device is also attached to the container, whereby upon removal of the tie down device from the container through the opening, the tie down device may be carried to the aircraft with the belt on the spool unwinding from the spool to a length to span the distance from the fixed container to the aircraft and the tie down device hook may be attached to the tie down eyelet of the aircraft to provide a connection therebetween with the spring urging on the spool maintaining the connection therebetween taut.

5 Claims, 3 Drawing Sheets

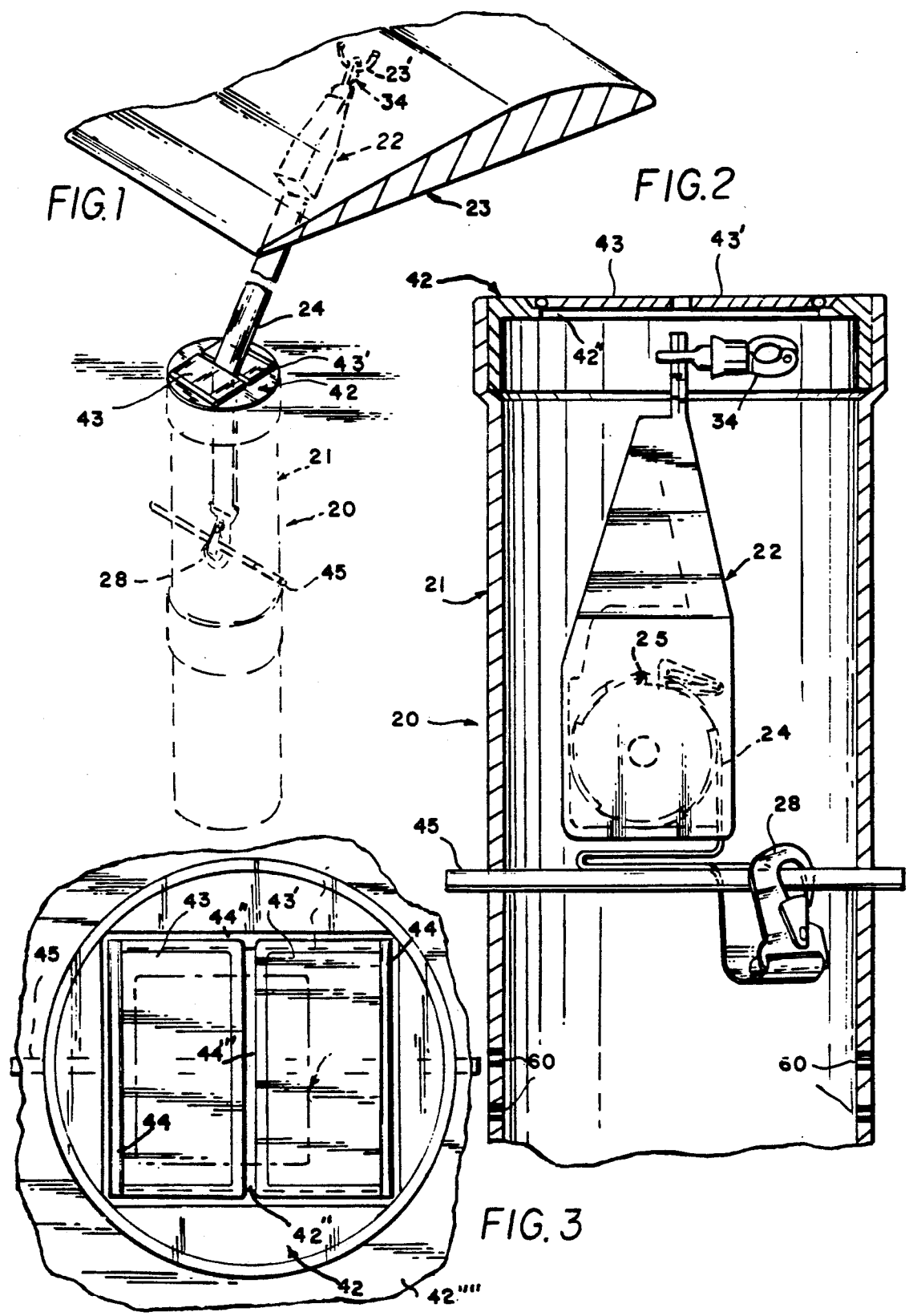

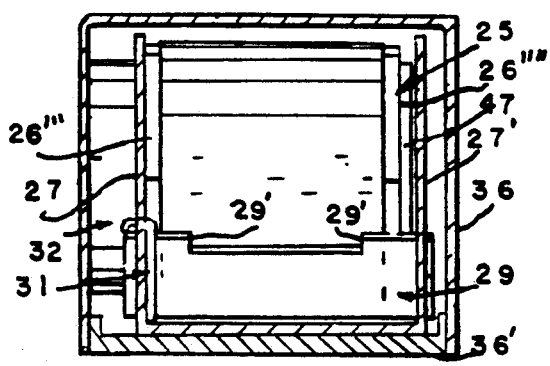
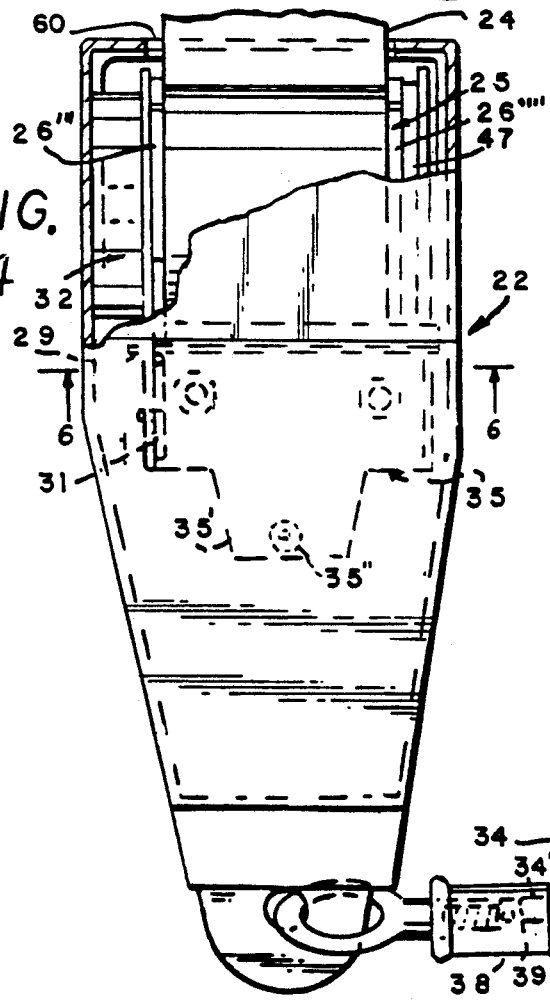
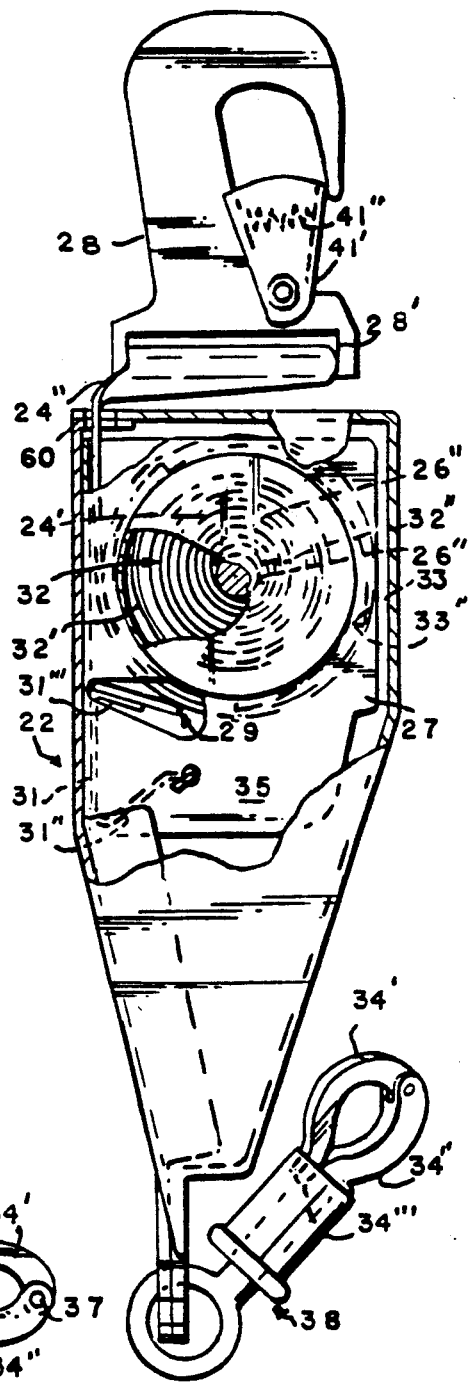

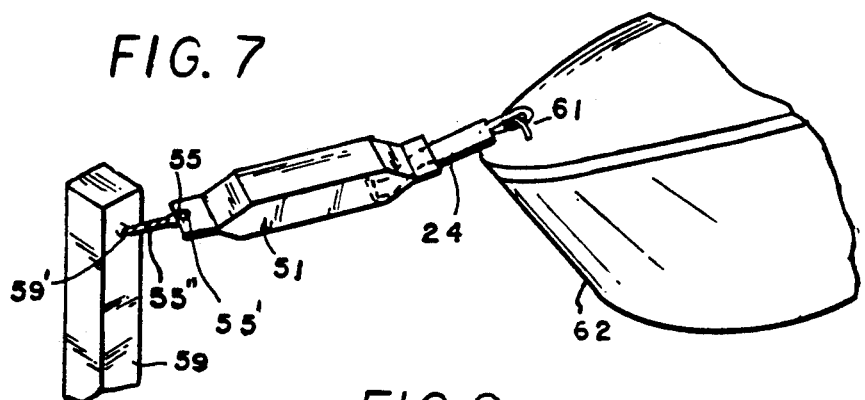
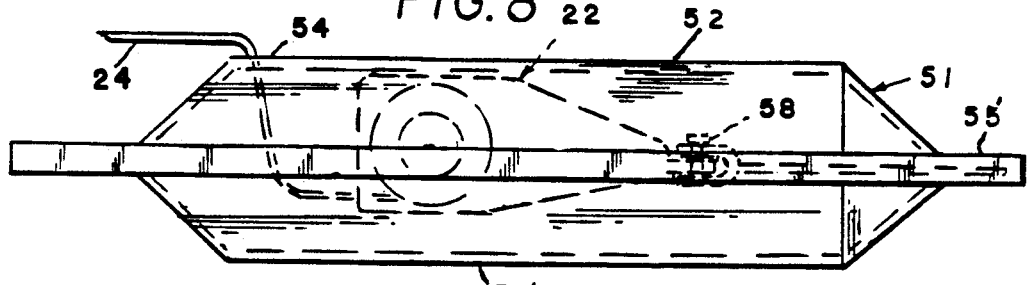
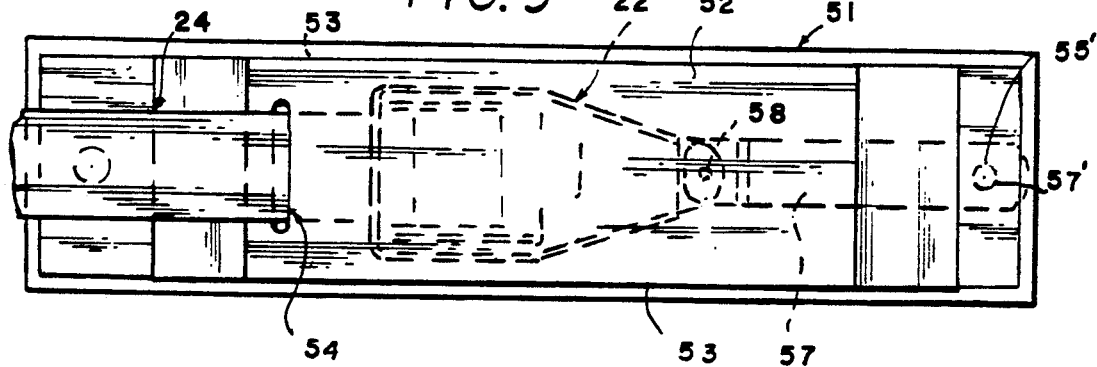
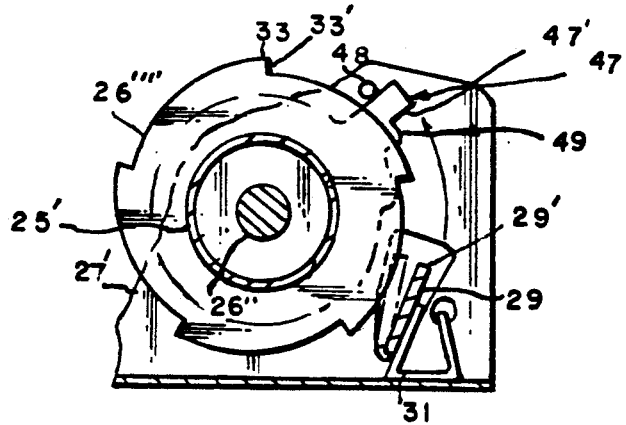

TIE DOWN APPARATUS

BACKGROUND OF THE INVENTION

This invention relates to restraining or tie down devices, more particularly, the invention relates to restraining or tie down devices for tieing down a movable object, such as an aircraft or boat, or a stationary object.

It is an object of the invention to provide a novel restraining or tie down device having a frame with hook means to mount the frame to a stationary object and a spool with a belt wound thereon and spring urged to a wound position, with a hook at the outer end of the belt for attachment of the belt to a stationary object and whereby the device may be moved to the movable object to be tied down with the belt unwinding to maintain the connection and with the device be attached to the movable object to provide a restraining or tie down connection.

It is a further object of the invention to provide a novel restraining device for restraining movable objects and having a container for storing the device in a stationary location and belt wound onto a spool on the device with the belt attached to the container whereby the device may be attached to the movable object with belt connecting the movable object with the container to restraining the movable object.

It is another object of the invention to provide a novel restraining or tie down device for restraining or tieing down an object such as an aircraft or boat, and to provide a flexible taut connection between, and which can be easily and quickly attached and detached.

It is another object of the invention to provide a novel restraining or tie down device which can be stored in a container when not in use.

Further objects and advantages of the invention will become apparent as the description proceeds and when taken in conjunction with the accompanying drawings wherein:

BRIEF DESCRIPTION OF THE DRAWINGS

FIG. 1 is a perspective view of the restraining or tie down device illustrating a container fixed in the ground for storing the tie down device and illustrating the tie down device removed from the container, with the outer end of the belt of the spool of the device attached to the container and with the tie down device attached to an eyelet in the wing of an aircraft for tieing down the aircraft to the ground.

FIG. 2 is a side elevational view of the container in the ground, with the tie down device stored in the container, with portions cut away.

FIG. 3 is a top plan view of the storage container for the tie down device, with the tie down device shown stored in the container.

FIG. 4 is a top plan view of the tie down or retraining device, with portions broken away to reveal the interior details.

FIG. 5 is a side elevational view of the tie down device with portions broken away to reveal the interior.

FIG. 6 is a cross-sectional view taken along line 6—6 of FIG. 5.

FIG. 7 is a perspective view of a modified tie down or restraining device, stored in a resilient cushion or container and use to tie down a boat to a pier.

FIG. 8 is a side elevational view of the modified tie down apparatus with the tie down device mounted or stored in the resilient container.

FIG. 9 is a top plan view of the modified tie down or retraining device illustrating the tie down device in a resilient container.

FIG. 10 is a cross-sectional view taken along line 10—10 of FIG. 4.

DESCRIPTION OF PREFERRED EMBODIMENT

Briefly stated, the invention comprises a tie down or restraining apparatus having a storage container fixed in the ground, a tie down device removably mounted in said storage container, said tie down device having a frame with a spool rotatably mounted on the frame and a flexible belt wound on said spool with its inner end fixed to said spool and its outer end attached to said container. A spring is mounted on said frame and urges said spool in a direction to wind said belt unto said spool. Hook means are mounted to said frame and said frame is removable from said container and may be moved to a movable object, such as an aircraft with a tie down eyelet, with said belt connection to said container causing said belt to unwind to enable said tie down device to be moved to said aircraft while remaining attached by said belt to the container, said frame having hook means attachable to said eyelet of said aircraft to provide a belt connection to said aircraft for tieing down an aircraft.

Referring more particularly to the drawings, in FIG. 1, the restraining or tie down apparatus 20 is shown with a container 21 mounted in the ground and a tie down device 22 removed from said container and attached to an eyelet 23' on an aircraft 23, with the belt 24 remaining attached to the container to provide a belt connection between the container and the tie down device and a hook connection between the tie down device and the eyelet of an aircraft to tie down the device for more secure storage of the aircraft.

The container 21 has a cap 42 threaded onto its top and pivotally mounted covers 43 and 43' which are pivotally mounted to the cap to open and close a rectangular opening 42" into the cylinder. The opening 42" is of sufficient size to receive the tie down device 22 therethrough so that the tie down device can be removed through the opening by opening the covers for use in tieing down aircraft and can be replaced in the container for storage when not in use.

The aircraft arresting or tie down device 22 has a main frame 25. A spool 26 is rotatably mounted within the frame between the two side panels 27 and 27' of the frame 25. The spool has a center shaft 26' fixed to the hub 26" of the spool. The spool has two annular flanges 26'" 26"" on opposite sides of the hub. The flat flexible belt 24 is wound on the hub 26" of the spool with its inner end 24' fixed to the hub of the spool. The outer end 24" of the belt has a conventional hook 28 with the end of the belt mounted in the slot 28' of the plate forming the hook 28. A pivotally mounted latch plate 29 is pivotally mounted in slots 29" in the side panels 27 and 27'. A spring 31 is mounted on one side panel 27, with its one end 31' engaged in a bore 31" in the panel and its other end 31'" engaged against the pivotally mounted plate 29 to urge the plate toward the flanges of the spool.

A coil spring 32 is also mounted on the one side panel 27, with the outer end 32' of the coil spring 32 attached to the side panel 27 and the inner end 32" attached to the shaft 26' of the spool, so that the rotation of the spool in a clockwise direction, when viewed from FIG. 2, acts to wind the spring about the shaft to cause placing of the spring under compression and cause the spring to urge the spool to rotate in a counterclockwise direction and thereby urge the belt or act to wind the belt onto the spool; since the belt is wound onto the spool by the spool rotating in a counterclockwise direction, when viewed from FIG. 2.

The pivotally mounted latch plate 29 is pivotally mounted in the V notches or the triangular slots 29" in the panels 27 and 27'. The spool's, annular flanges 26"' and 26"" each have annular notches 33 and 33' at intervals about their outer circumferential edges. The latch plate is pivotal in the notches to pivot its projecting edges 29' toward the flanges to engage the projecting edges 33" forming the notches to lock the spool from clockwise rotation relative to the frame 25 when viewed from FIG. 2.

The spring 31 engages against the latch plats 29 to urge the latch plate counterclockwise, when viewed from FIG. 2, into engagement with the notches 33 and 33' of the side flanges 27 and 27' of the spool, with the radial edges 33" of the notches locking the spool against clockwise rotation, when engaged against the latch plate 29.

The metal support plate 35 has the side panels 27 and 27' of the device fixed upright thereon by the base 35' being formed integrally with the side panels 27 and 27' and the base 35' being fixed to the support plate by nut and bolts 35", respectively. A plastic housing 36 has an open bottom 36' and d is fitted over the frame 21 of the device onto the base support plate to surround the frame of the device with bolt means fixing the housing 36 to the support plate 35.

The front hook 34, mounted on the front end of the device 21 at the one end of the frame 25, is of a conventional type which can be released from its engagement with an object while under tension. The one arm portion 34' is pivotally mounted to the arm portion 34" at the pivotal mounting 37, so that the lower end 34''' of the arm portion 34' can be pivoted out of a slot 39 in the fixed arm portion. A sleeve 38 is slidably mounted on the fixed arm portion 34" and a spring 38' is slidably mounted on the fixed arm portion 34" and urges the sleeve upward toward the lower end 34''' of the pivotal arm to surround and lock the pivotal arm portion closed as illustrated. The sleeve 38 can be slid downward in opposition to the biasing by the spring 38', to release the lower end of the arm portion so that an eyelet, if hooked to the hook 34, can be released.

A second hook 28 is attached to the outer end of the belt 24, by inserting the end of the belt in the slot 24' and then sewwing the end of the belt to an intermediate portion of the belt to attach the hook to the belt. It is of a conventional type, having a spring biased lever 41' spring biased by spring 41" to pivot about its axis 41'''' to close the hook.

The base support plate 35 will have a slot 60 for the belt 24 to travel through.

The tie down device has a conventional type spool camming action. The device has a cam plate 47 made of plastic and rotatable on the center shaft or rod 26' fixed to the spool. One flange 26"" of the spool is positioned frictionally flush against the plastic cam plate 47 with sufficient frictional engagement with the cam plate, so that rotation of the spool counterclockwise, when viewed from FIG. 10, will frictionally pivot the cam plate counterclockwise with the spool about shaft 26' until the projecting lug portion 46' of the cam plate engages against the pin 48 fixed to the side panel of the spool frame. The engagement of the lug against the pin 48 stops the cam plate from further counter clockwise movement with the spool.

If the spool is rotating clockwise, when viewed from FIG. 10, the frictional engagement of the annular flange 26"" against the cam plate will pivot the cam plate clockwise about rod 26' with the spool, until the projecting lug part 47' of the cam plate engages against the top edge 29' of the latch plate 29. This stops the cam plate against further clockwise movement with the spool.

Beginning with a belt 24 fully wound on the spool, when the spool is rotated clockwise, when viewed from FIG. 10, the belt is being unwound from the spool. If the stroke of unwinding is continuous from at least a near, fully wound spool; the fully wound belt 24 at its outer circumference on the spool will hold the latch plate 29 away from the spool, in the beginning of the unwinding, sufficiently far enough so that the cam plate 47 can pivot under the latch plate 29 with its ledge 49, and the ledge 49 will hold the latch plate 29 from pivoting in and engaging the notches 33 and 33' of the spool and stopping any further unwinding. By the cam plate preventing the latch plate from pivoting in, it enables the spool to continue to unwind until all the belt is unwound, even after the belt has unwound to a point that its outer circumference will no longer keep the latch plate from pivoting in.

However, if at some point during the unwinding after enough belt has been unwound from the spool that the remaining belt on the spool can no longer hold or prevent the latch plate from pivoting in; and if the operator stops unwinding and allows any winding to take place no matter how small so long as it is in excess of the arc of a circle the cam plate needs to pivot to move its ledge 49 away from under the latch plate, the frictional contact of the spool with the cam plate will move the cam plate out from under the latch plate, thereby removing it blocking action upon the latch plate.

Now, if the operator resumes unwinding, the cam plate no longer can hold the latch plate away and the latch plate will pivot in and block the spool from rotating to unwind, though it will allow winding. Consequently, the operator can only allow the winding of the belt to take place until the belt again acts to hold the latch plate away, so that the cam plate can during the initial unwinding pivot in and block the latch plate so that the unwinding can continue. However, the belt will not act to hold the latch plate away until nearly all the belt is again reqound.

The storage container 21 of the tie down device has a cylinder, which has a cap 42 at the top and a pair of covers 43 and 43' pivotally mounted to the cap on separate axes 44. Each cover has a rubber edgings 44" fitted about the edges of the covers 43 and 43'. The covers close to a flush position slightly below the edges of the cap 42 and are closed under a gravity action. The covers when closed have a narrow space 44''' between them to allow the belt 24 to extend through with the covers closed. The operator will hold the covers open with one hand while the operator removes the tie down device from the container through the opening 42" in the cap. A pin 45' extends across the cylinder at a location spaced below the top of the cylinder.

The cylinder is normally fixed in the ground in cement in air port ramp parking areas, where it is desired to have tie down attachments for tieing down aircraft parked on the ramp, with the top edge of the cap of cylinder flush with the ground 42''''. The fixing of the cylinder in cement will also fix the pin 45' in cement at is position across the cylinder. The pin is spaced down from the top of the cylinder a sufficient distance to fully receive the tie down device. The pin by extending across the cylinder prevents the tie down device from sliding down past the pin, the space being insufficient, so that the tie down device will normally rest in the cylinder on top of the pin when stored.

The tie down device 22 will be inserted into the cylinder with the belt slot first as illustrated in FIG. 2, and with the covers open. The hook 28 of the belt 24 of the tie down device will be attached to the pin 45', and will be left attached to the pin in the cylinder when the device is removed for attachment to the eyelet of an aircraft, for tieing down an aircraft.

OPERATION

The tie down apparatus will normally be operated as follows:

The aircraft will normally be parked within the range of the attachment of the tie down device when the full length of the belt is extended which is customarily 10 feet; although, it may be longer such as 15 feet. This enables the tie down device, when the belt 24 is extended fully, to reach one of the tie down eyelets on the aircraft, which this particular tie down device 22 is intended to tie down.

The operator will open the covers and remove the tie down device 22 from the container 21. The belt 24 will unwind from the spool, as the device 22 is moved away from the container 21 toward and to the aircraft, as the belt hook 28 of the tie down device 22 remains hooked to the container 21 in the ground. When the hook 34 of the tie down device 22 reaches the eyelet 23' of the aircraft, the hook 34 will be attached to the eyelet 23'. Since the belt 24 is spring urged toward its wound position, once the device 22 is attached to the plane or aircraft and the device is released from the operator's grasp, the spring 32 will wind up the belt 24 sufficiently to make the belt and tie down connection taut, If the operator allows the spring 32 to rewind the belt 24, even a small arcuate movement since only a small, arcuate movement of the cam plate is sufficient to release the latch plate; it will act to release the latch plate so that it will engage the notches of the flanges of the spool. The frictional engagement of the flange 26'''' of the spool in rotating against the flange of the cam plate 47 will normally be sufficient, with a small arcuate movement by the spool, to cause the cam plate 47 to pivot sufficiently to release the latch 29. This one way latch plate 29, when released or activated, prevents further unwinding of the belt, and thereby locks the belt from further unwinding by engaging in the notches of the flanges of the spool to keep the connection taut.

While the operator may initially draw the belt out of the device to the limit of its length, if he desires, or any length short of that limit; each time he stops drawing the belt further out and allow the spring urging to rewind the belt even slightly, this will normally release the cam plate from the latch plate and the latch plate will engage and prevent any further drawing out of unwinding of the belt.

This enables the belt to be drawn out of the device as the device is moved toward the aircraft by in one constant uninterrupted stroke until the device is close enough to the aircraft eyelet for easy attachment.

When it is desired to remove the tie down device from the aircraft eyelet, the operator will unhook the hook 34 from the aircraft eyelet even though it may be under tension. The hook 34 is of the type that can be detached or released from the aircraft while it is under tension and without the need to draw the belt further out for slack, as slack is not necessary to release or disengage the hook.

The operator will then move toward the container thereby gradually releasing the belt or causing slack in the belt, allowing the spring 32 to rewind the belt back onto the spool, by the spring rotating the spool counterclockwise when viewed from FIG. 2. The latch plate acts as a one way latch automatically rengaging in any rewinding in each aligned notch as the spool rewinds preventing any unwinding again so long as the plate is engagable. The plate is automatically reengagable until the belt is nearly fully rewound and the last few layers of belt wound onto the spool engage the plate and prevent the plate from engaging the notches as illustrated in FIG. 2.

When the belt 24 is fully wound onto the spool, the outer most layers 24'', approximately three to four annular layers, have a radius larger than the annular notches in the spool and accordingly, the belt layers physically engage the pivotally mounted latch 29 at its outer end portion 29' and push or pivot the latch away from the notches in the annular flanges and keep the projecting edge 29' of the latch 29 from engaging in the notches of the flanges of the spool so that the spool can freely move clockwise to unwind the belt as viewed from FIG. 1. The cam plate 47, having its flange frictionally engaged against the out side surfaces of the annular flange 26'''' is being urged to rotate clockwise with the spool and the friction will be sufficient to rotate the cam plate clockwise relative to the side panel causing the outermost projecting ledge portion 49 to slide under the latch plate 29 and lock the latch plate away from the notches while the spool is rotated clockwise, unwinding the belt from the spool and device. When the belt is drawn out clockwise to its desired extended length for tieing to the aircraft for example, and the operator stops accordingly drawing out the belt and thus stops rotating the spool clockwise, the cam plate will remain stationary with its ledge 49 holding the lugs of the locking plate away from the notches.

However, if the operator releases the belt even slightly so that the spring can urge the spool back counterclockwise even a few degrees of a turn rewinding the belt slightly, the friction will rotate the cam plate counterclockwise a few degrees which will be sufficient to pivot the outer ledge portion 49 away from beneath the latch plate, so the latch plate is free to pivot under its spring urging toward the notches in the spool, and since the belt will customarily be unwound more than a few layers on the spool, the belt layer no longer have a radius greater than the notches on the flanges of the spool so that they cannot keep the latch 29 from pivoting into the notches of the flanges of the spool, and thus the spring will pivot the latch plate counterclockwise causing its edge to engage into the notches and prevent further movement of the spool clockwise thus preventing further UNWINDING OF THE BELT from the spool, and each time the spring is allowed to wind the spool further counterclockwise thus further winding the belt back onto the spool, the latch 29 while allowing the winding of the belt back onto the spool will immediately reengage into the notches of the spool and prevent the belt from being unwound again to its former extended length, and each time the spring causes further winding of the belt back onto the spool the latch 29 relatches at its further rewound position and prevents any unwinding back of the belt.

Thus latch 29 prevents any unwinding at this point until the belt is nearly fully rewound back onto the spool and the belt again physically pushes the latch lugs away from the notches in the spool so that the frictional engagement of the one flange surface of the spool against the face of the cam plate will frictionally urge the cam plate counterclockwise again and pivot the cam plate counterclockwise relative to the side panel so that its edge 49 slides beneath the cam plate and holds the latch plate away from the notch as illustrated in dashed lines in FIG. 1, and the belt can now be drawn out again for another tie down operation, as the cam plate will hold the latch plate away from the notches as the belt is being drawn out or in other words being extended or unwound from the spool and device, extending it toward the aircraft, which it is intended to be tied down by attaching the outer end of the belt to the aircraft, The container for storing the tie down device will have a plurality of holes 60 along its bottom portions below the rod 45', to allow water and or moisture to drain out of the cylinder into the adjacent ground. In northern climates where freezing weather may be a factor the cylinder will be made approximately 7 plus feet deep so as to extend below the frost line. There will also be holes in the cylinder below the frost line so that moisture can more easily drain out into the surrounding ground in cold weather. The extended depth of the cylinder is to enable the cylinder to carry or transmit the warmth of the ground below the frost line up along the cylinder, which may be made of plastic, to keep the cylinder, and the air in the cylinder warmer and thereby drier with less moisture. Also, by the tie down device being stored in the cylinder with the belt slot down, as well as being mounted to the aircraft eyelet with the belt slot down, less moisture can enter into the tie down device through the slot in the housing, thereby minimizing problems of moisture damaging the mechanism in the tie down device.

In the modified form of restraining, tie down apparatus 51, illustrated in FIGS. 7-9, inclusive, has a tie down device 22 therein which is contructed in the same manner as in the first form of the invention, except that the tie down device is stored permanently within a flexible bag 51, which serves as a housing and protective cover for the tie down device.

The flexible resilient bag 51 is a resilient plastic bag with front and rear resilient plastic panels 52 and 52' sewn together along their edges along sewing line 53, with the tie down device mounted within the bag. The bag has a slot 54 for the outer end of the belt 24 to extend through. A hook 55 is mounted to one end of the bag by extending through an eyelet 55' in the bag. The hook also extends through an eyelet 57' in a metal strap 57 at one end of the metal strap. The other end of the metal strap 57 has a forked member extending on opposite sides of the rear end of the tie down device and a bolt 58 extends through the forked end of the strap and through the eyelet 41 in the housing of the tie down device 22 to thereby mount the tie down device at a fixed location within the bag.

The hook 55 is attached to a cable 55" and the cable is attached to an eyelet 59' mounted to a pier post or dock post 59 adjacent where the boat to be moored is located, to whereby attach the flexible bag and tie down device to the post. The bag 51 with the tie down device therein will be extended from the post toward the bow of the boat 62. The belt 24 will be drawn out from the device through the slot 54 by grasping the hook 28 at the end of the belt 24 and drawing the hook and belt to the boat. The hook 28 will be attached to a conventional eyelet 61 at the top of the bow of the boat. The operator will then release his grip of the belt, so that the spring of the tie down device is free to rewind the belt, until the belt is taut in a straight line connection between the dock connection and the eyelet connection on the boat.

The device will act to restrain the boat and keep the boat tied near to the dock or piling attachment, as the spring in the tie down device will wind up any slack in the belt, and the one way latch of the device will prevent any unwinding of the belt by its activation thereby keeping the boat near the dock. The tie down apparatus 50 including the tie down device 20 will be spaced sufficient back from the nearest point the boat can reach so that when the boat is drawn as close as possible to the dock, the belt will be sufficiently unwound from the spool that the latch plate can engage the notches of the flanges of the spool once the attachment is made and the operator releases the the belt to thereby prevent unwinding of the belt.

It will be obvious that various changes and departures may be made to the invention without departing from the spirit and scope thereof, and accordingly, it is not intended that the invention be limited to that specifically described in the specification or as illustrated in the drawings but only as set forth in the appended claims wherein:

What is claimed is:

1. A aircraft arresting device comprising an upright storage container having a top, bottom and surrounding sides with an opening in its top with means to facilitate fixing the container in the ground with its top opening flush with the top surface of the ground and cover means to open and close the top opening; a tie down device receivable within an interior of the container and sufficiently smaller than the top opening so as to be removable therethrough by opening said cover means; said tie down device having a frame with a pair of side panels fixed to the frame and a spool rotatably mounted between the side panels; an elongated flexible belt wound on said spool having an inner end attached to said spool and having an outer end with a first hook means attached to said outer end; said first hook means being also attached to said container; spring means mounted between said tie down device frame and said spool to urge said spool to rotate on said frame in a direction to wind said belt onto said spool; a second hook means attached to said tie down device frame whereby said tie down device may be removed from said container through said top opening and may be drawn toward an eyelet tie down of an aircraft, while said first hook means remains attached to said container, with said belt unwinding from said spool to a length to span the distance of movement of the tie down device from the container, with the first hook means on the belt of of the tie down device thereupon also being attached to said eyelet of said aircraft, and with the tension of the spring on the spool acting to keep the belt connection between the container and aircraft taut.

2. An aircraft arresting device according to claim 1 wherein said tie down device includes a latch means actuatable to latch the spool from further unwinding of the belt, while allowing said spool to rewind the belt, cam means actuating said latch means when said belt has been drawn at least partly away from the spool and said spring means has been allowed to even slightly rewind the spool by rotating in a direction to move even a relatively small arcuate length.

3. A vehicle arresting device comprising a tie down device and a container for storing said tie down device therein; said container having a bottom, surrounding sides and a top with an opening in the top adapted to be flush with and adjacent with the top surface of the ground and to be fixed stationary in the ground for tieing down a mobile vehicle by an eyelet of the vehicle by a straight line connection between the eyelet and the fixed container; said tie down device having a frame with a pair of side supports and with a spool rotatably mounted between the side supports; an elongated, flexible belt having an inner end attached to said spool and wound onto said spool and having an outer end with a first attachment means attached thereto; a second attachment means attached to said frame of said tie down device; spring means mounted between said frame and said spool to urge said spool to rotate on said frame in a direction to wind said belt onto said spool; at least one of said first and second attachment means being attached to said container; said container opening in its top being of a size to allow at least the belt of the tie down device and at least one of the said first and second attachment means to be extended therethrough, whereby the at least one said first and second attachment means may be attached to the eyelet of the vehicle, with the belt being unwound from the spool to a length between said first and second attachment means to span the distance between the container and the vehicle, and with the spring means providing tension on the connection between the vehicle and container taut.

4. A vehicle arresting device for tieing down a vehicle upon a stationary surface comprising an upright container having tie down device within the container; said tie down device having a spool with an elongated flexible belt having an inner end wound on and attached to the spool and having an outer end; said container being adapted to be fixed beneath the stationary surface with a bottom and surrounding sides and an openable cover at its upper end substantially flush with the stationary surface; at least the belt of the tie down device adapted to be extended from the container through the openable cover to provide a tie down connection between the container and an eyelet attached to the vehicle, when upon the surface; said tie down device having a frame supporting the spool; a first hook means attached to the frame, and a second hook means attached to the outer end of the belt; at least one of the hook means of the device being adapted to be drawn from the container through an opening by the cover with the belt unwinding from the spool to a length for the one hook means to reach and be hooked to an eyelet on the vehicle, the other hook means being hooked to the container, with the extended belt providing a tie down connection between the container beneath the surface and the vehicle upon the surface; spring means in the tie down device urging said spool in a direction to wind the belt to maintain the belt taut in its connection.

5. An vehicle arresting device according to claim 4 wherein said tie down device includes a latch means actuatable to latch the spool from further unwinding of the belt, while allowing said spool to rewind the belt, cam means actuating said latch means when said belt has been drawn at least partly away from the spool and said spring means has been allowed to even slightly rewind the spool by rotating in a direction to move even a relatively small arcuate length.

* * * * *